July 7, 1925.

P. HOFFMANN

AUTOMOBILE PLATFORM

Filed Dec. 18, 1923

WITNESSES

INVENTOR
Philipp Hoffmann,
BY
ATTORNEY.

July 7, 1925. 1,545,426
P. HOFFMANN
AUTOMOBILE PLATFORM
Filed Dec. 18, 1923 3 Sheets-Sheet 3

WITNESSES
Oliver W. Holmes

INVENTOR
Philipp Hoffmann,
BY Henry J. Locke,
ATTORNEY.

Patented July 7, 1925.

1,545,426

UNITED STATES PATENT OFFICE.

PHILIPP HOFFMANN, OF NEW YORK, N. Y.

AUTOMOBILE PLATFORM.

Application filed December 18, 1923. Serial No. 681,332.

*To all whom it may concern:*

Be it known that I, PHILIPP HOFFMANN, a citizen of the United States of America, residing at 4527 Park Avenue, county of Bronx, New York city, New York, have invented certain new and useful Improvements in Automobile Platforms, of which the following is a specification.

This invention relates to elevating platforms for automobiles and like vehicles.

An object of this invention is to provide a bodily movable frame and platform proper vertically movable within the frame for raising an automobile or like vehicle, the platform proper being of open construction or provided with an opening to afford access, when the platform proper has been elevated, to the under parts of the automobile to permit inspection and repair or other attention. The frame is movable bodily to accommodate positioning where desired on the floor of a garage or other suitable building, or on the ground.

A further object of the invention is to provide additional floor space for the storage of automobiles, whereby upon elevating an automobile on the platform proper, a second automobile may be run within the frame and under the elevated platform proper.

Further features and objects of the invention will be more fully understood from the following detail description and the accompanying drawings in which—

Figure 1:
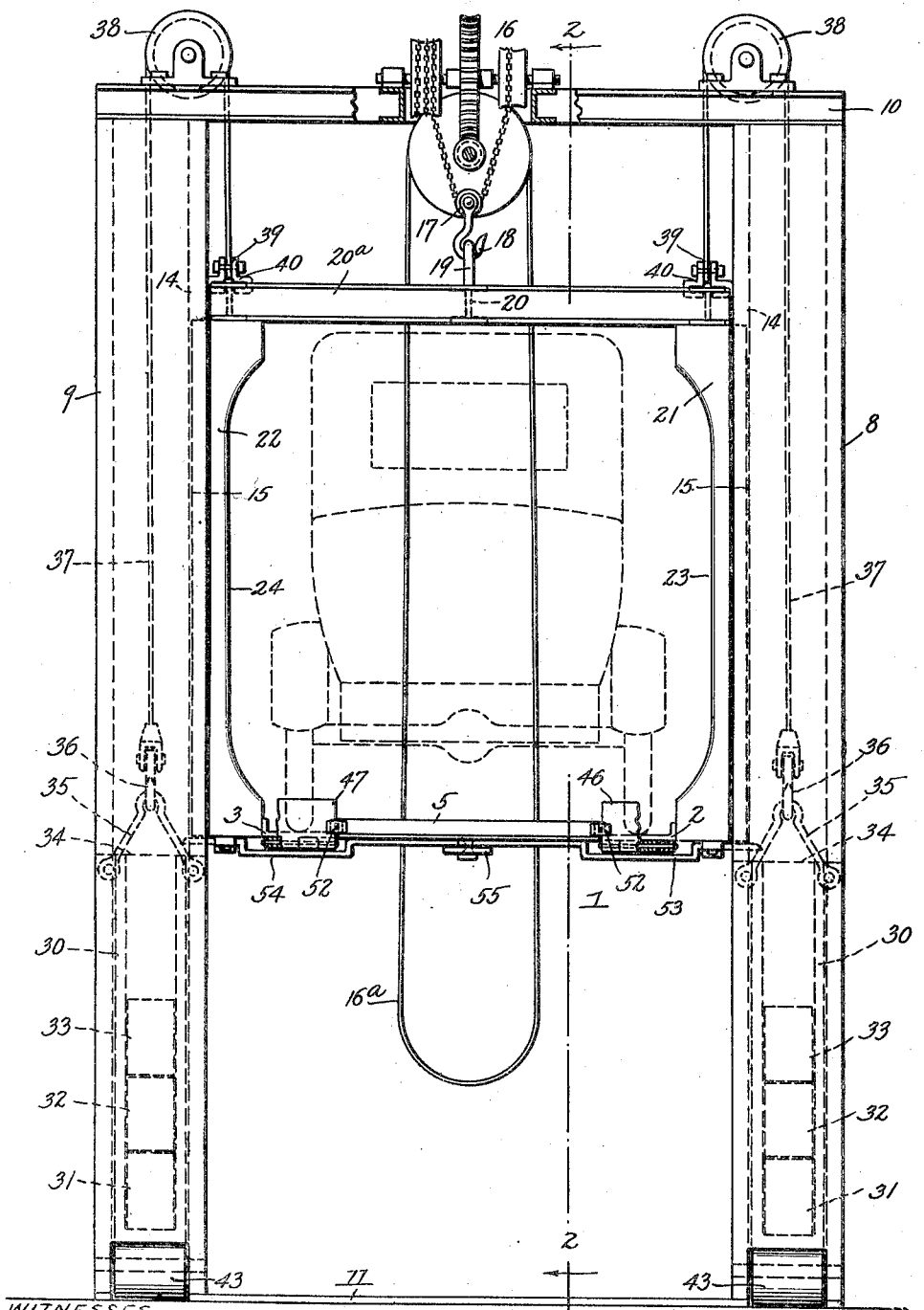
Fig. 1 is a front end elevation of one form of my invention, showing the platform proper and an automobile thereon raised to elevated position.
Figure 3:
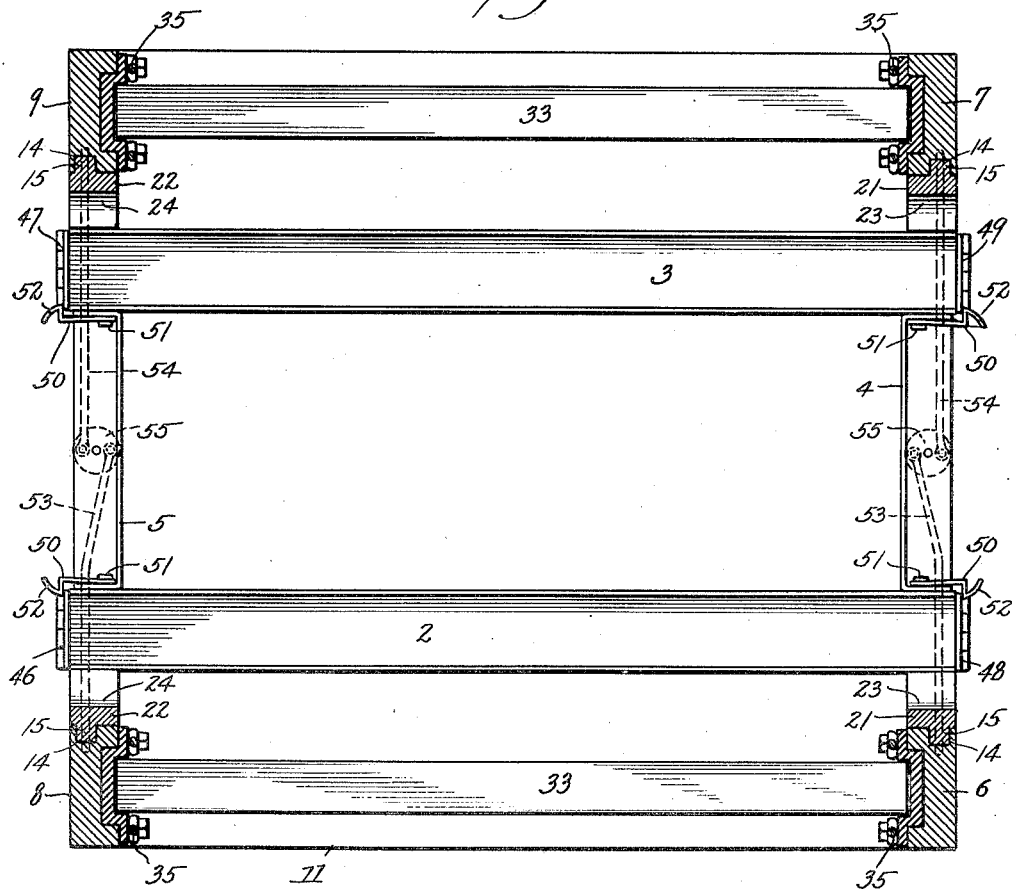
Fig. 3 is a sectional view on line 3—3 of Fig. 2.

Referring to the drawings, the movable platform proper is indicated 1 and comprises generally a support for the wheels of an automobile or the like and an opening through such support or otherwise to permit access to the chassis and other under parts of the automobile, when the platform proper has been elevated. As is shown in Fig. 3, such support for the wheels comprises a pair of spaced runways 2, 3 for the respective right and left wheels, which supports 2, 3 are fixedly preferably channelled rails and connected with one another by means of the front and rear cross beams 4, 5. Such cross beams 4, 5 are slidingly disposed relative to the frame uprights 6, 7, and 8, 9, arranged as pairs at the respective front and rear ends of the frame. The uprights 6, 7, see Fig. 1, are rigidly connected to one another at the top by the upper cross beam 10 of relatively great strength, and also at the bottom, preferably by a plate 11, adapted to rest on the floor of the garage, or on the flat ground. The pair of uprights 8, 9, at the opposite end of the structure are similarly connected at the top and bottom by parts indicated by like reference numbers.

The vertical movement of the platform proper may be guided by any suitable means such as a groove 14 in the upright 6, into which projects the extension 15 of the cross beam 4, and similarly for the remaining sliding connections; like reference numbers indicate like parts.

The means for elevating and lowering the platform may be of any suitable type, as for example, a differential pulley 16, located on an upper central cross beam 10, and comprising generally the block 17, having the hook 18 for engagement with the eye 19, secured to the central cross beam 20 of the platform proper 1. The hoist chain is indicated at $16^a$. Such cross beam 20 is preferably connected to the platform proper by means of end beams $20^a$ and sets of uprights 21, 22, suitably secured at their respective lower ends to the runways 2, 3, and at their respective upper ends to the cross beams $20^a$.

Such uprights 21 22 are preferably cut away at their inner vertical faces as indicated at 23, 24 to afford increased clearance between the car when positioned on the platform 1 and the vertical uprights 21 22, respectively. The enlarged upper and lower ends of the respective sets of uprights, 21 22, further afford increased area for connection of the lower ends directly to the runways 2, 3 of the platform proper 1 and to the respective upper cross beams $20^a$.

Preferably, the platform is provided with suitable counter-balancing means, and as one example of such counter-balancing means I have illustrated the casing 30 on the opposite sides of the elevator frame and arranged to receive a variable number of weights 31, 32, 33, etc., of predetermined individual amounts of weight, through its open top 34. Each casing 30 is connected by suitable means such as inverted V-shaped eyes 35, at the upper ends of each casing 30, in which eyes 35 are received the hooks 36 at the respective ends of the respective counter-weight 37, extending over the sheaves 38, located at the top, or on the cross beams 10, and the opposite ends 39 of the cables 37 are connected respectively to suitable clamps 40 for attachment to the front and rear cross beams 20ª of the platform proper 1.

Figure 2:
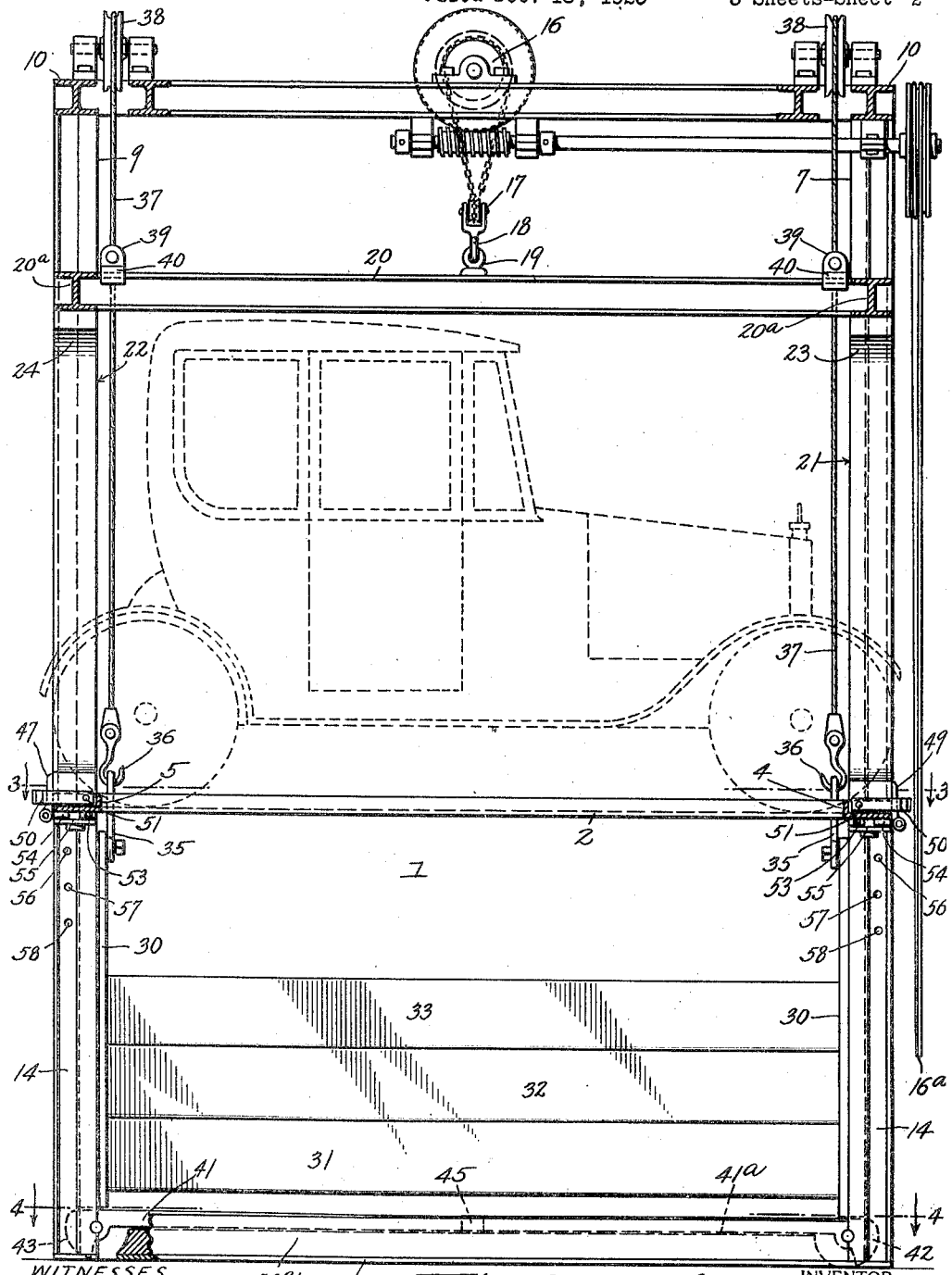
Fig. 2 is a sectional view on line 2—2 of Fig. 1.

As is indicated in the drawings, see Figs. 1 and 2, each casing 30 is made of ample capacity for receiving predetermined weights therein to serve as counter-weights on the opposite sides of the platform proper 1; thus for a Ford of approximately sixteen hundred pounds, two weights 31, 32, in the respective casings 30 may serve to counterbalance the movable platform loaded with a Ford. Correspondingly, for more heavily weighted cars, which at the present day reaches an approximate maximum of thirty-six hundred pounds, additional counter-weight units would be placed in the respective casings. Such additional counter-weight units may be located at the side of the frame and each unit provided with a perforation or sunken hook-hole for attachment to the hook of a block and tackle for elevating the counter-weight unit into a casing 30, and similarly for removing such counter-weight unit or units from a casing 30.

Figure 4:
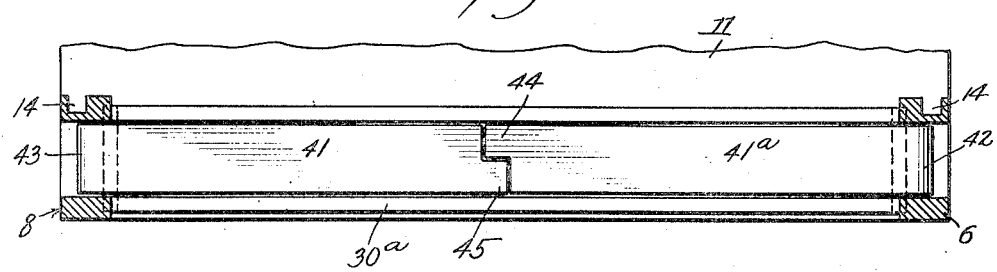
Fig. 4 is a sectional view on line 4—4 of Fig. 2.

Suitable means are provided for supporting the casing 30 and its counter-weights when in elevated position. Thus, as is indicated in Figures 2 and 4, a set of depending arms 41, 41ª, connected at their respective opposite ends 42, 43 in the respective channels 30ª at the bottom of the sides of the frames, whereby upon lowering of the platform proper 1, and corresponding elevation of the casings 30, the arms 40, 41 are swung upwardly to contact at their free ends 44, 45 with the bottom of a casing 30. Preferably, the ends 42, 43 are counter-poised by their enlarged weighted portions and the free ends 44, 45 arranged angularly, as indicated in Fig. 4, to be supported within the channel 30ª when in lowered and concealed position.

Preferably, the runways 2, 3, are provided with approach-ways, 46, 47 respectively pivoted, see Figs. 1, 2 and 3, to the front ends of the runways 2, 3. Such pivotal mounting affords ready accommodation for the front wheels of the automobile, irrespective of the point of stopping of the platform proper 1 when in lowered position. Such pivotal mounting also permits upward swinging and locking of the approach-ways 46, 47 when the automobile has been positioned on the run-ways 2, 3, whereby the approach-ways 46, 47 serve as stops or brakes in the possible event of movement of the wheels of the automobile while the platform proper 1 is being elevated or lowered. Similar approach-ways 48, 49 may be provided at the opposite ends of the run-ways 2, 3.

As a simple method of locking each of the approach-ways 46, 47, 48, 49, I have shown a catch 50 secured by a bolt or screw 51 to one side of a runway 2, 3, and either formed of spring steel or equivalent, or pressed by a spring yieldingly locking the approach-way when in raised position. The head 52 of each catch 50 is appropriately curved to effect displacement of each hook 50 upon raising of an approch-way.

Suitable means are also provided for locking the platform proper 2 when in its elevated position, whereby to hold the platform proper 1 independently of the counter-weight means, and independently of the elevating and lowering means. I have indicated, see Figs. 1, 2 and 3, a set of bolts 53, 54 at the respective front and rear of the elevator frame, each set of bolts 53, 54 being operated manually by a common cam 55. Appropriate bolt holes of any desired number 56, 57, 58, etc., are arranged in the uprights 6, 7, 8, 9, for receiving the free ends of the bolts 53, 54.

Preferably, the counter-weight casings are brought into contact with the bottom of the frame or with the floor of the garage or equivalent when the platform proper is in fully elevated position. It will be noted from the drawings that the casings 30 of the respective counterweights are shown supported in their lowered position by the respective channels 30ª and the respective sets of arms 40, 41, collapsed in the channels 30ª, whereby each set of arms 40, 41 serve as common means for supporting the counter-weight when in lowered position and when in elevated position.

The bottom of the frame may be supported on wheels, or rollers, to afford movement of the frame bodily, as when shifting the frame on the floor of a garage.

The invention is also applicable for elevating a car in the open air, as for draining crank casings and other operations.

Upon elevating an automible or other vehicle on the platform proper to a sufficient height, another automobile or other vehicle may be run under the platform proper, and thus provide increased or more advantageous floor space in garages for storage of cars, afforded by the absence of any transversely extending connecting member between the uprights 6, 7 and 8, 9, excepting the low, flat base strips 11 at the front and rear, as will appear from the drawings.

Whereas, I have described my invention by reference to specific forms thereof it will be understood that many changes and modifications may be made without departing from the spirit of the invention.

I claim.

1. An elevating platform for automobiles and like vehicles comprising a frame, a platform vertically movable in said frame, means for vertically moving said platform, counter-weight means for said platform and common means for supporting said counter-weight means when said platform is in its elevated position and for supporting said counterweight when in its lowered position.

2. An elevating platform for automobiles and like vehicles, comprising a frame, a platform mounted in said frame, means for moving said platform vertically upwardly and downwardly within said frame, adjustable complementary counter-weight means on opposite sides of said frame for said platform and common means for respectively supporting each counter-weight means when in its elevated position and when in its lowered position.

3. An elevating platform for automobiles and like vehicles, comprising a frame, a platform mounted in said frame, means for moving said platform vertically upwardly and downwardly within said frame, complementary counter-weight means on opposite sides of said frame for said platform and common means for respectively supporting said complementary counter-weight means when in their elevated positions and lowered positions respectively.

4. An elevating platform for automobiles and like vehicles comprising a frame, a platform proper vertically movable within said frame, said platform comprising a pair of runways spaced from one another to provide an opening intermediate the sides and ends of the platform to afford access therethrough to the under portions of an automobile, an approachway for each runway and pivotally carried by each runway respectively at the approach end thereof and means for vertically moving said platform upwardly and downwardly in said frame.

5. An elevating platform for automobiles and like vehicles comprising a frame, a platform proper vertically movable within said frame, said platform having an opening intermediate its sides and ends to afford access therethrough to the under portions of an automobile, an approachway for said platform proper disposed at the approach end thereof, means for pivoting said approachway to said platform, means for holding said approachway in raised position when said platform proper is in elevated position to serve as a stop and means for vertically moving said platform upwardly and downwardly in said frame.

6. An elevating platform for automobiles comprising a wholly self-supporting open frame having vertically extending members and horizontally extending members interconnecting said vertically extending members adjacent their upper ends, a platform proper for receiving an automobile and means carried by said frame for moving said platform proper upwardly and downwardly within said frame, said platform moving means being wholly spaced from the clearance between the lower ends of said vertically extending members below the upper position of said platform proper and said frame being substantially free from obstruction within said frame between the lower ends of said vertically extending members to permit the passage of an automobile within said clearance upon elevating the platform proper, thereby providing for the storage of two automobiles within the frame.

7. An elevating platform for automobiles comprising a wholly self-supporting open frame having vertically extending members and horizontally extending members interconnecting said vertically extending members adjacent their upper ends, means for movably supporting said frame on a floor or other suitable support, a platform proper for receiving an automobile and means carried by said frame for moving said platform proper upwardly and downwardly within said frame, said platform moving means being wholly spaced from the clearance between the lower ends of said vertically extending members below the upper position of said platform proper and said frame being substantially free from obstruction within said clearance between the lower ends of said vertically extending members to permit the passage of an automobile within said clearance upon elevating the platform proper, thereby providing for the storage of two automobiles within the frame.

In testimony whereof I have signed this specification this 24th day of October 1923.

PHILIPP HOFFMANN.